Aug. 31, 1965     R. W. EVANS     3,203,264
SHEAR SPRING GUIDES FOR VIBRATORY EXCITERS
Filed Aug. 11, 1961     2 Sheets-Sheet 1

INVENTOR.
ROBLEY W. EVANS
BY
Marshall, Wilson & Click
ATTORNEYS

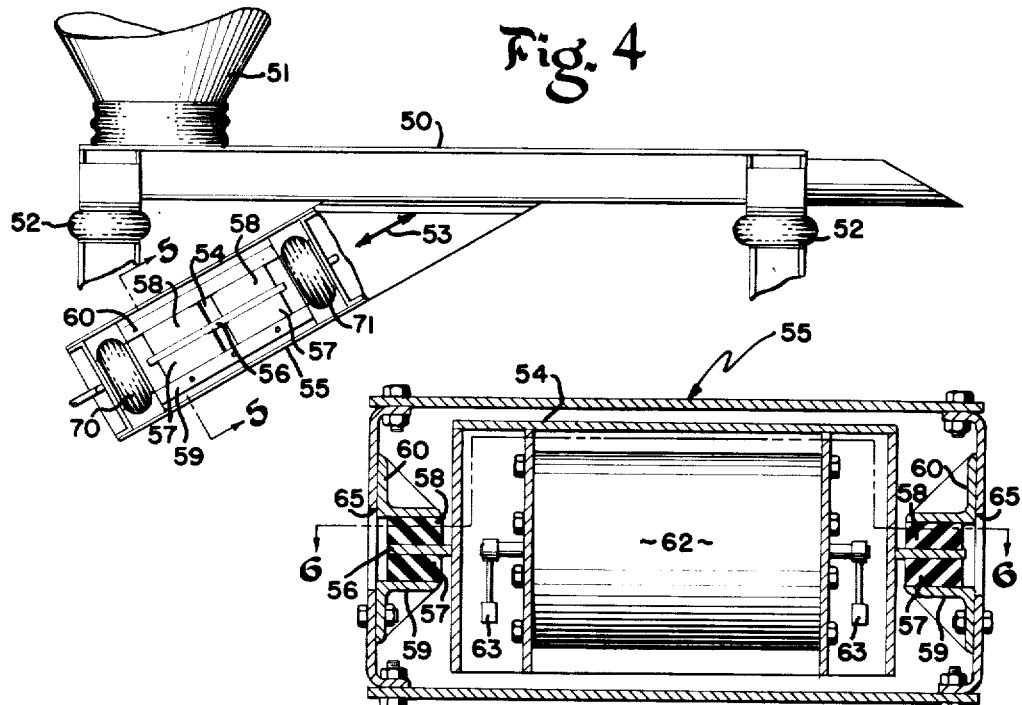
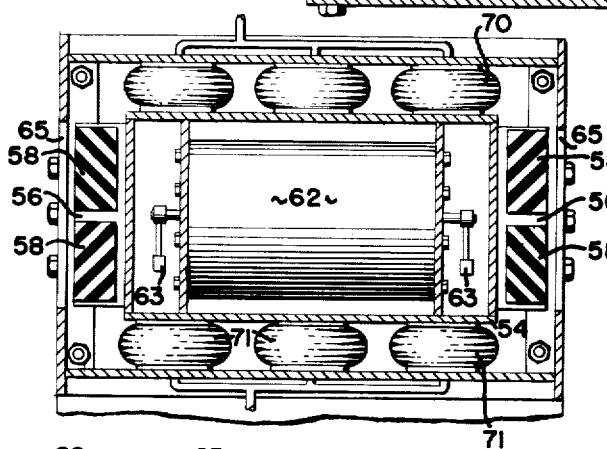
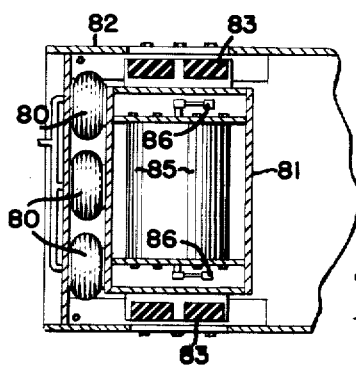

United States Patent Office 3,203,264
Patented Aug. 31, 1965

3,203,264
SHEAR SPRING GUIDES FOR VIBRATORY EXCITERS
Robley W. Evans, New Albany, Ind., assignor to Rex Chainbelt Inc., a corporation of Wisconsin
Filed Aug. 11, 1961, Ser. No. 130,962
6 Claims. (Cl. 74—61)

This invention relates to vibratory work performing apparatus and in particular to an improved construction of means for transmitting vibratory force from a vibration exciter to a work performing member.

It is common practice to drive vibratory conveyors, feeders, screens and similar work performing members, particularly in the larger sizes, by vibratory force produced by rotating eccentric weights. In most apparatus of this type the length of the stroke of vibration is comparatively short but the required forces to overcome the inertia of the vibrated members is often very large. In most apparatus of this type the peak vibratory forces applied to the work member, that member which contacts the material to be conveyed or processed, is in the order of three to five times the weight of the work member and usually in the order of four times that weight. If the vibration exciter, the shaft carrying the rotating eccentric weights, is journaled directly in the work member the bearings journaling the shaft must withstand these peak forces. This requires large rugged bearings that are able to withstand these large vibratory forces as well as the shock loading that may be applied when large loads are dropped onto the work member.

To reduce the forces on the bearings carrying the eccentric weights, the eccentric weights are often journaled in an exciter member that is coupled to the work member by resilient coupling means which in the past have consisted of either coil springs or inflated pneumatic springs. A system employing coil springs is illustrated in FIG. VII of U.S. Patent No. 2,958,228 issued to R. M. Carrier, Jr. et al. This system, the same as that shown in U.S. Patent No. 2,353,492 to O'Connor except for mass ratios and tuning, is constructed and tuned so that the exciter member vibrates through a stroke much larger than the stroke of the work member. Because of the larger stroke much smaller forces are required from the eccentric weights and therefore less load is imposed upon the bearings carrying the shaft of the eccentric weights.

When inflated pneumatic springs are substituted for the coil springs, as is shown in FIG. VI of U.S. Patent No. 2,984,339, the advantages of the force multiplication may still be obtained as in the other systems and in addition, by varying the inflation pressure, the tuning and magnification of the system may be varied while the equipment is in operation without varying the shaft speed. One disadvantage of the tunable system shown in the Patent No. 2,984,339 is that for best performance the system is operated at speeds below the resonant frequency of the tuned system and any substantial loss in inflation pressure is apt to bring the system into exact resonance whereby destructive amplitudes of vibration occur. Furthermore, for satisfactory life of the pneumatic springs such a system requires means for guiding the exciter member relative to the work member.

The principal object of this invention is to provide a resilient support for carrying the exciter member on the work member in which the resilient support not only guides the exciter member relative to the work member but also contributes most if not all of the spring force required to tune the vibratory system to the operating speed of the eccentric weights. A cooperating air spring also connected between the exciter member and the work member then serves to raise the natural frequency of the system above the operating speed by the amount required to obtain the desired decrease in the amplitudes of vibration.

Another object of the invention is to provide an easily serviced, rugged vibratory support for the exciter member of a vibratory system.

A still further object of the invention is to provide a rugged resilient support for the exciter member that provides a first natural frequency in the direction of the desired vibratory motion and a higher natural frequency in a generally vertical direction at right angles to the desired motion.

More specific objects and advantages are obtained from a vibratory system constructed according to the invention.

According to the invention, an exciter member is resiliently coupled to a work member by one or more resilient elements and one or more air springs with the resilient elements serving to support and guide the exciter member along the vibratory path and provide the major portion of the spring force required to tune the vibratory system. Preferably, the resilient elements are formed of elastomer blocks that are either bonded or frictionally held between opposing surfaces of the exciter member and work member that extend parallel to the path of vibration.

Vibratory drives constructed according to the invention are illustrated in the accompanying drawings.

In the drawings:

FIG. 4 is a side elevation with parts broken away showing another feeder using a slightly modified form of support for the vibratory exciter member.

FIG. 5 is a generally vertical section taken along the line 5—5 of FIG. 4.

FIG. 6 is a generally horizontal section taken along the broken line 6—6 of FIG. 5.

FIG. 7 is a view somewhat similar to FIG. 6 but of a modified form of construction.

These specific figures and the accompanying description are intended merely to illustrate the invention and not to impose limitations on its scope.

Figure 1:
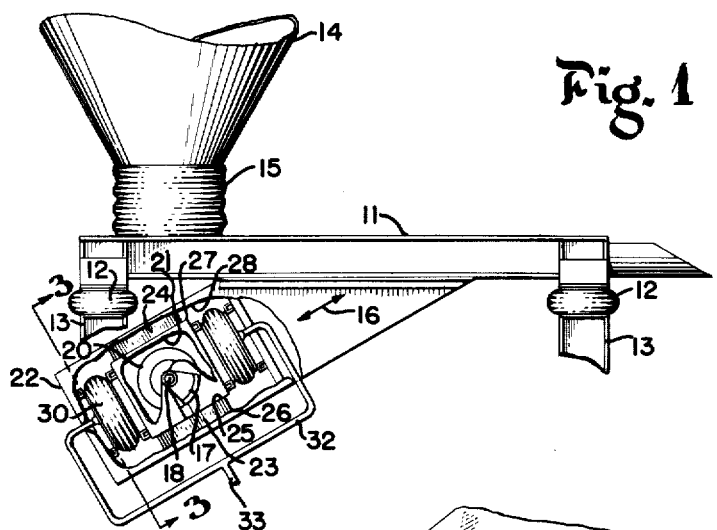
FIG. 1 is a side elevation with parts broken away of a vibratory feeder including a vibratory drive constructed according to the invention.

In a vibratory system such as the vibratory feeder illustrated in FIG. 1 a work member 11, shown as a feeder trough, is supported on isolating springs 12 resting on the top of columns or pillars 13. The springs 12 preferably are air springs which exhibit a very low spring rate in comparison with their load carrying ability.

Material to be fed is supplied to the trough 11 through a chute 14 which may or may not include a flexible sock 15. If a rigid extension of the hopper 14 or chute 14 is provided it should extend down to within a short distance of the top of the trough 11.

The work member or trough 11 is driven in vibration along an inclined path indicated by a double tipped arrow 16 by forces from eccentric weights 17 mounted on an armature shaft 18 of a motor 20 that is rigidly mounted in an exciter member 21 which in turn is resiliently mounted in a framework 22 rigidly attached to the work member 11.

As a feature of the invention the exciter member 21 is guided in the frame 22 by a plurality of elastomer blocks 23 and 24, the blocks 23 being compressed between a lower surface 25 of the exciter member 21 and an opposing surface 26 of the frame 22. Likewise the elastomer blocks 24 are compressed between an upper surface 27 of the exciter member 21 and a downwardly facing opposing surface 28 of the frame 22.

The elastomer blocks 23 and 24, which preferably are of rubber, are thus stressed in shear by vibratory motion of the exciter member along the path 16 and are stressed in compression by the vibrational force of the eccentric weights exerted along a path at right angles to the vibratory path indicated by the double tipped arrow 16. Also the elastomer blocks are of sufficient length parallel to the desired path of vibration to prevent any substantial rocking or rotary motion of the exciter member 21. The elastomer blocks 23 and 24 are preferably selected so that the natural frequency of the system comprising the blocks, the work member 11, and exciter member 21 is a few percent higher than the operating speed of the motor 20.

In addition to the elastomer blocks 23 and 24 serving as resilient elements, a pair of air springs 30 and 31 that are interconnected through small diameter tubing 32 and inflated through a line 33 are provided to aid the elastomer blocks in establishing the total resilient coupling between the exciter member 21 and the frame 22. By varying the inflation pressure of the air springs the total effective spring rate of the combination of the resilient means may be raised so as to detune the vibratory system and thus reduce the amplitude of vibration of the work member 11 in response to the vibratory force from the eccentric weights 17.

In this arrangement the resilient elastomer blocks 23 and 24 are held in place by frictional forces only produced when the blocks are compressed between the opposing surfaces. In the installation of this arrangement the exciter member with the upper blocks 24 in place on guides, such as channel irons 35, is pushed up into place within the frame 22. Then the lower elastomer blocks 23 and their guides 36 are brought into place and the whole assembly then compressed as a bottom plate 37 of the frame is tightened into place. Alternatively, the lower guides 36 may be mounted from the sides and connected to the top of the frame 22 to permit these members to be put in place and the elastomer blocks compressed before the bottom plate is attached to the frame 22.

Figure 2:
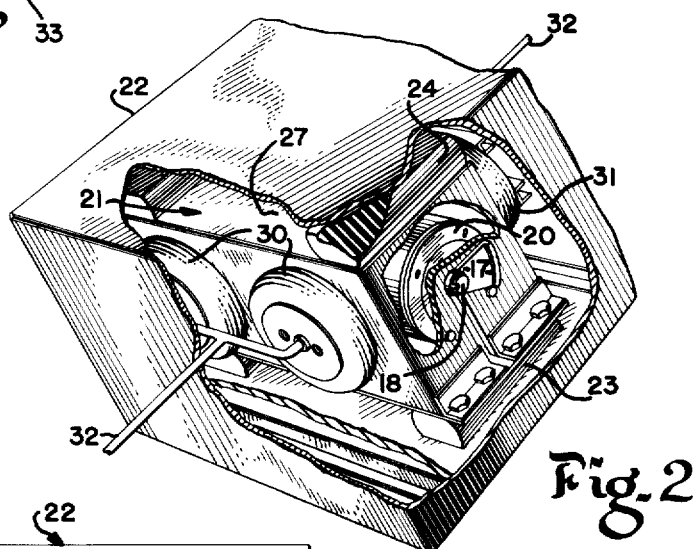
FIG. 2 is an enlarged perspective view with parts broken away of the improved vibratory drive.
Figure 3:
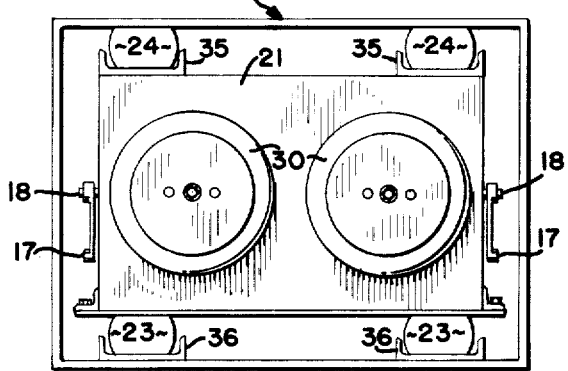
FIG. 3 is a sectional view taken substantially along the line 3—3 of FIG. 1.

A generally similar arrangement of the vibratory drive is illustrated in FIGS. 4, 5, 6 and 7. As is shown in these figures, a vibratory work member 50 that receives material from a hopper 51 is resiliently supported on isolator springs 52 and is driven in vibration along an inclined vibratory path, indicated by double tipped arrow 53, by an exciter member 54 mounted in a frame 55 extending downwardly parallel to the vibratory path. The exciter member 54 is provided with a laterally extending flange or shelf 56 that is sandwiched between elastomer blocks 57, 58 held between frame members 59 and 60. As was mentioned in connection with the assembly shown in FIGS. 1, 2 and 3 the elastomer blocks 57 and 58 may either be bonded to the opposing surfaces of the flange 56 and the opposing frame members 59 and 60 or may merely be compressed between these members so as to be frictionally held in place. This arrangement is preferable to that illustrated in the first figures because of the greater stability of the system in resisting torsional oscillations of a motor 62 that drives eccentric weights 63. This greater stability is obtained because of the relative thinness of the flange or shelf 56 extending along the sides of the exciter member 54 so that the forces of the elastomer blocks 57 and 58 act substantially normal to the flange 56 in resisting torsional motion whereas the elastomer blocks 23 and 24, as may be seen in FIG. 1, resist the torsional stresses by both compression and shear, in fact, principally by shear stresses in the material. Since the elastomer blocks are much stiffer in compression than they are in shear the arrangement shown in FIGS. 5 and 6 provides a much more stable assembly. This arrangement also offers the advantage that windows 65 may be included in the side walls of the frame 55 to provide access to the elastomer blocks 57 and 58.

In the system shown in FIGS. 4, 5 and 6 air springs 70 and 71 corresponding to the springs 30 and 31 are included between the exciter member 54 and the frame 55. These air springs are arranged so that by varying their inflation pressure the tuning of the system may be varied and therefore the transmission of force from the exciter member 54 carrying the eccentric weights 63 to the frame 55 and work member 50.

While a plurality of air springs 70, 71 have been shown, in some cases one spring on each side or a single spring on one side alone may be sufficient to provide the desired range of tuning.

In fact as shown in FIG. 7 air springs 80 are shown connecting an exciter member 81 to a surrounding frame 82. These air springs are arranged on one side only of the exciter member 81 and the static or average force of the air springs is resisted by shear stress in elastomer support blocks 83 that correspond to the elastomer blocks 23, 24 or 57, 58. In this arrangement as in previous arrangements a drive motor 85 drives eccentric weights 86 to provide the vibratory energy or vibratory force.

In each of these arrangements the elastomer blocks provide the major portion of the resilient force determining the resonant frequency of the vibratory system at the same time that they support the exciter member. By selecting a resonant frequency slightly higher than the operating speed the exciting force of the eccentric weights is multiplied to provide a much larger force acting against the work member. The air spring or air springs serve to detune the system thus reducing the force multiplication and therefore the amplitude of vibration. Since deflating the air springs does not tune the system to exact resonance the system is not endangered by failure of the air pressure supply.

The elastomer blocks are capable of handling very large forces and thus provide strong reliable support for large, heavy exciters used in large vibratory apparatus.

Various modifications may be made in the arrangement of the resilient supports for an exciter without departing from the spirit and scope of the invention.

Having described the invention, I claim:

1. In a vibratory work performing system, in combination, a work member of substantial mass to be vibrated, an exciter member having a mass less than said work member, elastomer members stressed in shear connecting the exciter member to the work member for vibration along a work path, said elastomer members cooperating with said exciter and work members to form a vibratory system having a natural frequency along the work path that is different from the natural frequency normal to the work path, a shaft extending normal to the work path and carrying eccentric weights journaled in the exciter member, means for rotating the shaft at a constant speed generally equal to said natural frequency along said work path, and an air spring connected in parallel with said elastomer members and adapted to adjustably raise the natural frequency of the vibratory system relative to the speed of rotation of the shaft.

2. In a vibratory work performing system, in combination, a work member of substantial mass to be vibrated along a work path, an exciter member, a shaft carrying eccentric weights journaled in the exciter member, means for rotating the shaft at a substantially constant speed, elastomer springs connecting the members, said springs being stressed in shear by relative motion of said members along the work path and in compression by relative motion normal to the work path and cooperating with said members to form a vibratory system having a natural frequency of vibration along the work path that is generally equal to said constant speed, and at least one air spring acting along the work path in parallel with said elastomer springs connecting said members which is effective by adjustment of its inflation pressure to tune the vibratory system to a frequency sufficiently removed from the operating speed to control the amplitude of vibration.

3. In a vibratory work performing system, in combination, a work member of substantial mass to be vibrated along a work path, an exciter member, a shaft carrying eccentric weights journaled in the exciter member, means for rotating the weights at a substantially constant speed, surfaces on the exciter member and work member facing each other and extending parallel to each other and to the work path, elastomer blocks interposed between and operatively connected to said surfaces to be stressed in shear by relative motion of the work member and exciter member along said work path, said blocks serving to support said exciter member relative to the work member and to cooperate with the members to form a resonant vibratory system having a natural frequency generally equal to said constant speed, at least one air spring connected between the members in parallel with the elastomer blocks, said air spring cooperating with the elastomer blocks to tune the resonant system, and means for adjusting the inflation pressure of the air spring whereby the response of the system to the eccentric weights may be adjusted.

4. A vibrating system according to claim 3 in which the elastomer blocks are compressed and frictionally held between said parallel surfaces.

5. A vibrating system according to claim 3 in which flanges extending outwardly along each side of the exciter member constitute the surfaces that receive the elastomer blocks.

6. A vibrating system according to claim 3 in which a second air spring is arranged to oppose said air spring and cooperate therewith to control the turning of the vibratory system.

References Cited by the Examiner

UNITED STATES PATENTS

| 2,729,332 | 1/56 | Gruner | 74—61 X |
| 2,741,926 | 4/56 | Kluge | 74—26 X |
| 2,854,130 | 9/58 | Adams | 198—220 |
| 2,984,339 | 5/61 | Musschoot | 74—61 X |
| 3,058,577 | 10/62 | Musschoot | 198—220 |
| 3,089,582 | 5/63 | Musschoot | 74—61 X |
| 3,112,922 | 12/63 | Musschoot | 248—22 X |

BROUGHTON G. DURHAM, *Primary Examiner.*